US010737783B2

(12) United States Patent
Buyse et al.

(10) Patent No.: US 10,737,783 B2
(45) Date of Patent: Aug. 11, 2020

(54) CONTROL SYSTEMS FOR UNMANNED AERIAL VEHICLES

(71) Applicant: RSQ-Systems SPRL, Genval (BE)

(72) Inventors: Mathieu Buyse, Genval (BE); Jean Marc Coulon, Sant Julia de Loria (AD); Mike Blavier, Vilvoorde (BE)

(73) Assignee: RSQ-Systems SPRL, Genval (BE)

( * ) Notice: Subject to any disclaimer, the term of this patent is extended or adjusted under 35 U.S.C. 154(b) by 375 days.

(21) Appl. No.: 15/872,588

(22) Filed: Jan. 16, 2018

(65) Prior Publication Data
US 2019/0217953 A1 Jul. 18, 2019

(51) Int. Cl.
B64C 39/02 (2006.01)
B64C 27/50 (2006.01)

(52) U.S. Cl.
CPC ............ *B64C 39/024* (2013.01); *B64C 27/50* (2013.01); *B64C 2201/042* (2013.01); *B64C 2201/08* (2013.01); *B64C 2201/108* (2013.01); *B64C 2201/141* (2013.01); *B64C 2201/146* (2013.01)

(58) Field of Classification Search
CPC .................. B64C 2201/042; B64C 2201/08
See application file for complete search history.

(56) References Cited

U.S. PATENT DOCUMENTS 2,948,489 A 8/1960 Miller, Jr. et al.
2,980,365 A 4/1961 Yohe
3,148,847 A 9/1964 Manificat
3,149,803 A 9/1964 Petrides et al.
(Continued)

FOREIGN PATENT DOCUMENTS

CA 3009980 A1 7/2017
CA 3018601 A1 9/2017
(Continued)

OTHER PUBLICATIONS

International Search Report and Written Opinion for Application No. PCT/US2019/013681 dated May 1, 2019 (12 pages).
(Continued)

*Primary Examiner* — Brian M O'Hara
(74) *Attorney, Agent, or Firm* — Michael Best & Friedrich LLP

(57) ABSTRACT

Unmanned aerial systems including an unmanned aerial vehicle and a command device. The unmanned aerial vehicle includes a propulsion system, a vehicle power source, a vehicle electronic controller, and a vehicle coupling mechanism. The command device includes a command power source, a command electronic controller, and a command coupling mechanism. The vehicle electronic controller is without power from the vehicle power source when the vehicle coupling mechanism is connected to the command coupling mechanism. The command electronic controller is without power from the command power source when the vehicle coupling mechanism is connected to the command coupling mechanism. The vehicle electronic controller receives power from the vehicle power source when the vehicle coupling mechanism is separate from the command coupling mechanism. The command electronic controller receives power from the command power source when the vehicle coupling mechanism is separate from the command coupling mechanism.

19 Claims, 8 Drawing Sheets

(56) References Cited

U.S. PATENT DOCUMENTS

| | | | |
|---|---|---|---|
| 3,223,359 | A | 12/1965 | Quick et al. |
| 8,350,403 | B2 | 1/2013 | Carroll |
| 8,948,928 | B2 | 2/2015 | Alber et al. |
| 9,056,676 | B1 | 6/2015 | Wang |
| 9,056,687 | B2 | 6/2015 | Shachor et al. |
| 9,139,310 | B1 * | 9/2015 | Wang .................... B64C 39/02 |
| 9,457,900 | B1 | 10/2016 | Jones et al. |
| 9,663,214 | B2 | 5/2017 | Guetta et al. |
| 9,671,787 | B2 | 6/2017 | Foinet et al. |
| 9,696,725 | B2 * | 7/2017 | Wang .................... G05D 1/0669 |
| 9,789,947 | B2 | 10/2017 | Glass et al. |
| 9,826,256 | B2 | 11/2017 | Sham |
| 9,952,022 | B2 | 4/2018 | Ueno et al. |
| 9,975,632 | B2 | 5/2018 | Alegria |
| 10,246,188 | B2 | 4/2019 | Ichihara et al. |
| 10,364,026 | B1 | 7/2019 | Hanlon et al. |
| 10,370,102 | B2 | 8/2019 | Boykin et al. |
| 10,507,914 | B2 | 12/2019 | Walker et al. |
| 2009/0005164 | A1 | 1/2009 | Chang |
| 2009/0294584 | A1 | 12/2009 | Lovell et al. |
| 2009/0314883 | A1 | 12/2009 | Arlton et al. |
| 2010/0308174 | A1 | 12/2010 | Calvrley |
| 2011/0180667 | A1 | 7/2011 | O'Brien et al. |
| 2011/0315810 | A1 | 12/2011 | Patrov |
| 2012/0181380 | A1 | 7/2012 | Van Staagen et al. |
| 2013/0233964 | A1 | 9/2013 | Woodworth et al. |
| 2014/0183300 | A1 | 7/2014 | MacCulloch et al. |
| 2015/0142250 | A1 | 5/2015 | Cavender-Bares et al. |
| 2015/0153741 | A1 | 6/2015 | North et al. |
| 2015/0298806 | A1 | 10/2015 | Vander Lind et al. |
| 2016/0200437 | A1 | 7/2016 | Ryan et al. |
| 2016/0318607 | A1 | 11/2016 | Desai et al. |
| 2017/0029105 | A1 | 2/2017 | Ferren |
| 2017/0043872 | A1 | 2/2017 | Whitaker et al. |
| 2017/0126031 | A1 | 5/2017 | Mo |
| 2017/0161972 | A1 | 6/2017 | Moloney et al. |
| 2017/0193308 | A1 | 7/2017 | Buyse et al. |
| 2017/0235018 | A1 | 8/2017 | Foster et al. |
| 2017/0259941 | A1 | 9/2017 | Briggs, IV et al. |
| 2017/0275025 | A1 * | 9/2017 | Johnson .............. G05D 1/0676 |
| 2018/0009549 | A1 | 1/2018 | Sullivan |
| 2018/0050797 | A1 | 2/2018 | Palmer et al. |
| 2018/0050800 | A1 | 2/2018 | Boykin et al. |
| 2018/0118374 | A1 | 5/2018 | Lombardini et al. |
| 2018/0212413 | A1 | 7/2018 | Hundemer |
| 2018/0251216 | A1 | 9/2018 | Whitaker |
| 2018/0312276 | A1 | 11/2018 | Miller et al. |
| 2019/0088156 | A1 | 3/2019 | Choi et al. |
| 2019/0106208 | A1 | 4/2019 | Sun et al. |
| 2019/0144114 | A1 | 5/2019 | Chen et al. |
| 2019/0161183 | A1 | 5/2019 | Hagianu |
| 2019/0220038 | A1 * | 7/2019 | Shih .................... B64C 9/00 |
| 2019/0295033 | A1 * | 9/2019 | Longin .............. G06Q 10/0833 |

FOREIGN PATENT DOCUMENTS

| | | |
|---|---|---|
| DE | 102005014949 A1 | 10/2006 |
| EP | 3287358 A1 | 2/2018 |
| FR | 3037448 A1 | 12/2016 |
| JP | 2017-218061 A1 | 12/2017 |
| WO | 2007/141795 A1 | 12/2007 |
| WO | 2016/200021 A1 | 12/2016 |
| WO | 2017/029611 A1 | 2/2017 |
| WO | 2017/147188 A1 | 8/2017 |
| WO | 2018/100564 A1 | 6/2018 |

OTHER PUBLICATIONS

International Search Report and Written Opinion for Application No. PCT/IB2019/000877 dated Dec. 13, 2019 (14 pages).

International Search Report and Written Opinion for Application No. PCT/IB2019/000889 dated Dec. 5, 2019 (13 pages).

International Search Report and Written Opinion for Application No. PCT/US2019/020573 dated Jun. 19, 2019 (15 pages).

* cited by examiner

US 10,737,783 B2

CONTROL SYSTEMS FOR UNMANNED AERIAL VEHICLES

BACKGROUND

Unmanned aerial systems including remotely piloted and autonomous unmanned aerial vehicles (UAVs) are used in a wide variety of applications such as surveillance, filming, and exploration. One important consideration in designing an unmanned aerial vehicle is battery life. Some current designs increase battery life by including higher capacity batteries. However, higher capacity batteries weight more and increase the amount of power needed to sustain continuous flight. Another important consideration in designing an unmanned aerial vehicle is the manner in which a user launches the unmanned aerial vehicle. Some current designs include a remote controller that a user manipulates to launch the unmanned aerial vehicle. Other current designs include a push button that is attached to the body of the unmanned aerial vehicle. Such conventional designs have generally been considered satisfactory for their intended purpose. However, there is still a need for improved design of unmanned aerial systems with longer battery life and quicker launching capabilities.

SUMMARY

The disclosure provides an unmanned aerial system. In one embodiment, the unmanned aerial system includes an unmanned aerial vehicle and a command device. The unmanned aerial vehicle includes a propulsion system, a vehicle power source, a vehicle electronic controller, and a vehicle coupling mechanism. The propulsion system is configured to provide sustained flight of the unmanned aerial vehicle. The command device includes a command power source, a command electronic controller, and a command coupling mechanism. The command coupling mechanism is configured to connect with the vehicle coupling mechanism. The vehicle electronic controller is without power from the vehicle power source when the vehicle coupling mechanism is connected to the command coupling mechanism. The command electronic controller is without power from the command power source when the vehicle coupling mechanism is connected to the command coupling mechanism. The vehicle electronic controller receives power from the vehicle power source when the vehicle coupling mechanism is separate from the command coupling mechanism. The command electronic controller receives power from the command power source when the vehicle coupling mechanism is separate from the command coupling mechanism.

In some embodiments, the vehicle coupling mechanism includes a first switch that selectively electrically connects the vehicle power source to the vehicle electronic controller, and the command coupling mechanism includes a second switch that selectively electrically connects the command power source to the command electronic controller.

In some embodiments, the vehicle power source is electrically disconnected from the vehicle electronic controller when the vehicle coupling mechanism is connected to the command coupling mechanism. The command power source is electrically disconnected from the command electronic controller when the vehicle coupling mechanism is separate from the command coupling mechanism. The vehicle power source is electrically connected to the vehicle electronic controller when the vehicle coupling mechanism is separate from the command coupling mechanism. The command power source is electrically connected to the command electronic controller when the vehicle coupling mechanism is separate from the command coupling mechanism.

In some embodiments, the first switch includes a first normally-closed switch, and the second switch includes a second normally-closed switch.

In some embodiments, the first switch includes a first push-to-break biased switch, and the second switch includes a second push-to-break biased switch. In some such embodiments, the vehicle coupling mechanism further includes a first protrusion, and the command coupling mechanism further includes a second protrusion. The first protrusion presses the second push-to-break biased switch when the vehicle coupling mechanism is connected to the command coupling mechanism. The second protrusion presses the first push-to-break biased switch when the vehicle coupling mechanism is connected to the command coupling mechanism.

In some embodiments, the first switch includes a first normally-closed biased reed switch and a first magnet. The second switch includes a second normally-closed biased reed switch and a second magnet. The first magnet is positioned in close proximity to the second normally-closed biased reed switch when the vehicle coupling mechanism is connected to the command coupling mechanism. The second magnet is positioned in close proximity to the first normally-closed biased reed switch when the vehicle coupling mechanism is connected to the command coupling mechanism.

In some embodiments, the first switch includes a first normally-closed biased optocoupler, and the second switch includes a second normally-closed biased optocoupler. In some such embodiments, the vehicle coupling mechanism further includes a first protrusion, and the command coupling mechanism further includes a second protrusion. The second protrusion is positioned to block a first optical path of the first normally-closed biased optocoupler when the vehicle coupling mechanism is connected to the command coupling mechanism. The first protrusion is positioned to block a second optical path of the second normally-closed biased optocoupler when the vehicle coupling mechanism is connected to the command coupling mechanism.

In some embodiments, responsive to the vehicle coupling mechanism being separated from the command coupling mechanism, the vehicle electronic controller is configured to activate the propulsion system of the unmanned aerial vehicle.

In some embodiments, responsive to the vehicle coupling mechanism being separated from the command coupling mechanism, the command electronic controller is configured to transmit a location signal via a command transceiver of the command device.

In some embodiments, responsive to receiving the location signal via a vehicle transceiver of the unmanned aerial vehicle, the vehicle electronic controller is configured to determine a location of the command device. The vehicle electronic controller is also configured to operate the propulsion system based on the location of the command device such that the unmanned aerial vehicle is positioned within a predetermined distance from the location of the command device.

In some embodiments, the command device is incorporated in a wearable device.

In some embodiments, the propulsion system includes two or more rotors that are positionable in a collapsed configuration and in a deployed configuration. Responsive to the vehicle coupling mechanism being separated from the command coupling mechanism, the two or more rotors are moved from the collapsed configuration to the deployed configured.

The disclosure also provides an unmanned aerial system. In one embodiment, the unmanned aerial system includes an unmanned aerial vehicle. The unmanned aerial vehicle includes an airframe, a vehicle power source, a propulsion system, one or more vehicle sensors, and a vehicle electronic controller. The vehicle power source is disposed within the airframe. The propulsion system is operatively mounted to the airframe and configured to provide sustained flight of the unmanned aerial vehicle. The one or more vehicle sensors are configured to detect motion of the airframe. The vehicle electronic controller is disposed within the airframe. The vehicle electronic controller is configured to track the motion of the airframe based on data received from the one or more vehicle sensors. The vehicle electronic controller is also configured to determine when the airframe is moving along a parabolic trajectory based on the data received from the one or more vehicle sensors. Responsive to determining when the airframe is positioned at a vertex of the parabolic trajectory, the vehicle electronic controller is configured to activate the propulsion system.

In some embodiments, the propulsion system includes two or more rotors and one or more motors. The one or more motors are operatively coupled to the two or more rotors. The vehicle electronic controller activates the propulsion system by sending control signals to the propulsion system which cause the two or more rotors to rotate.

In some embodiments, the unmanned aerial system further includes a command device that is coupleable to the airframe of the unmanned aerial vehicle. The vehicle electronic controller is without power from the vehicle power source when the unmanned aerial vehicle is connected to the command device. The vehicle electronic controller receives power from the vehicle power source when the unmanned aerial vehicle is separate from the command device.

In some embodiments, upon the vehicle electronic controller receiving power from the vehicle power source, the propulsion system is inactive until the vehicle electronic controller determines that the airframe is positioned at the vertex of the parabolic trajectory.

In some embodiments, upon receiving power from the vehicle power source, the vehicle electronic controller tracks the motion of the airframe to determine when the airframe is moving along the parabolic trajectory.

In some embodiments, the one or more vehicle sensors are further configured to detect an orientation of the airframe. The vehicle electronic controller is further configured to determine when the airframe is in a predetermined orientation based on the data received from the one or more vehicle sensors. The vehicle electronic controller is also configured to activate the propulsion system when the airframe is positioned at the vertex of the parabolic trajectory and the airframe is in the predetermined orientation.

Other aspects and embodiments will become apparent by consideration of the detailed description and accompanying drawings.

BRIEF DESCRIPTION OF THE DRAWINGS

In FIG. 4A, the unmanned aerial vehicle is connected to the command device. In FIG. 4B, the unmanned aerial vehicle is separate from the command device.

In FIG. 5A, the unmanned aerial vehicle is connected to the command device. In FIG. 5B, the unmanned aerial vehicle is separate from the command device.

In FIG. 6A, the unmanned aerial vehicle is connected to the command device. In FIG. 6B, the unmanned aerial vehicle is separate from the command device.

Figure 1:
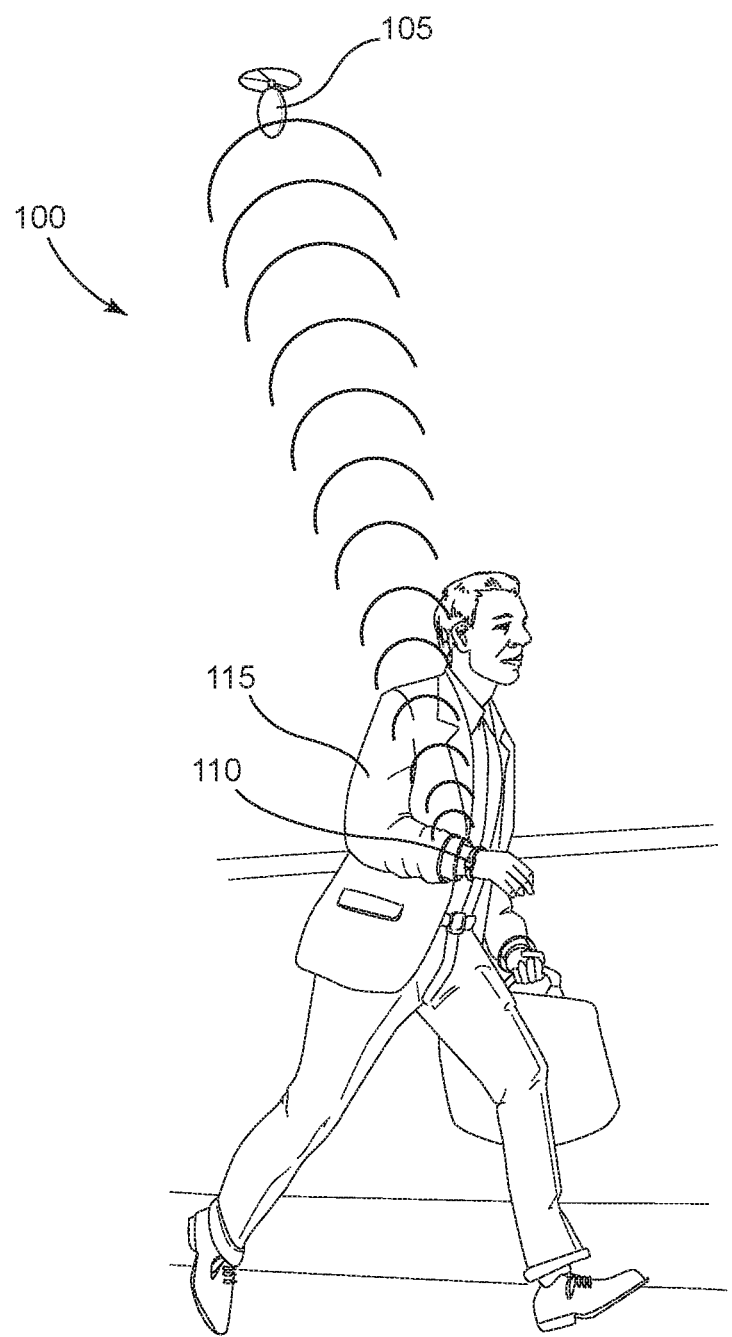
FIG. 1 is a diagram of an unmanned aerial system, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments illustrated.

The apparatus and method components have been represented where appropriate by conventional symbols in the drawings, showing only those specific details that are pertinent to understanding various embodiments so as not to obscure the disclosure with details that will be readily apparent to those of ordinary skill in the art having the benefit of the description herein.

DETAILED DESCRIPTION

Before any embodiments are explained in detail, it is to be understood that no embodiment is necessarily limited in its application to the details of construction and the arrangement of components set forth in the following description or illustrated in the following drawings. Other embodiments are possible and embodiments described are capable of being practiced or of being carried out in various ways.

It should also be noted that a plurality of different structural components may be utilized to implement the disclosure. Furthermore, and as described in subsequent paragraphs, the specific configurations illustrated in the drawings are intended to exemplify certain embodiments. Alternative configurations are possible.

FIG. 1 is a diagram of one example embodiment of an unmanned aerial system 100. The unmanned aerial system 100 includes an autonomous unmanned aerial vehicle (UAV) 105 and a command device 110. A user 115 can carry the unmanned aerial vehicle 105 and the command device 110 on his or her person. The unmanned aerial vehicle 105 can be launched, either by the user 115 or automatically. In some embodiments, unmanned aerial vehicle 105 is configured to receive control commands from the command device 110. Alternatively or in addition, the command device 110 acts as a tracking device and the unmanned aerial vehicle 105 is configured to maintain a flight position within a set (or predetermined) distance from the command device 110.

The unmanned aerial system 100 illustrated in FIG. 1 is provided as one example of such a system. The methods described herein may be used with systems with fewer, additional, or different components in different configurations than the unmanned aerial system 100 illustrated in FIG. 1. For example, in some embodiments, the unmanned aerial system 100 includes fewer or additional unmanned aerial vehicles and may include fewer or additional command devices.

Figure 2:
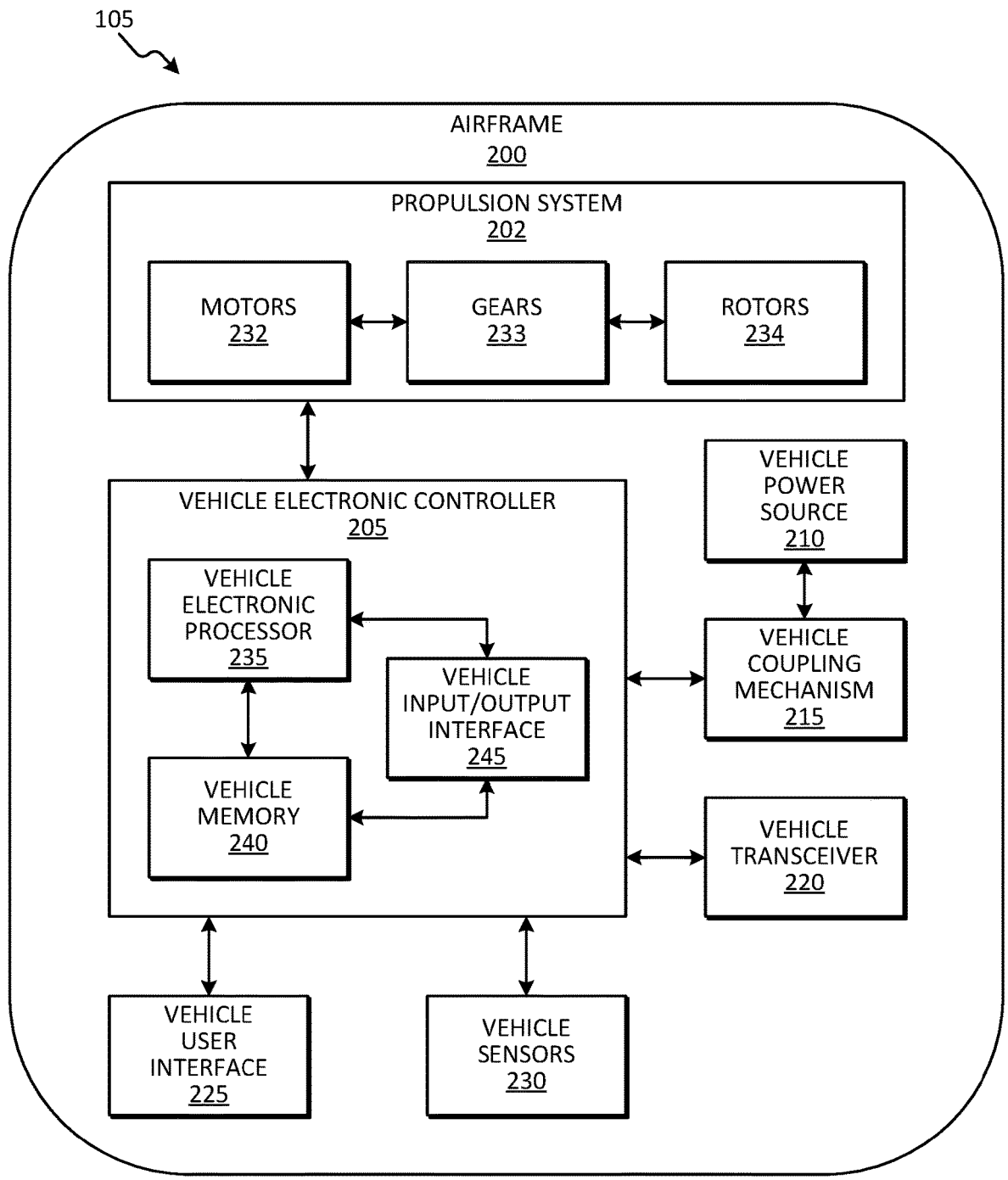
FIG. 2 is a diagram of an unmanned aerial vehicle included in the unmanned aerial system of FIG. 1, in accordance with some embodiments.

FIG. 2 is a block diagram of one example embodiment of the unmanned aerial vehicle 105. In the embodiment illustrated, the unmanned aerial vehicle 105 includes an airframe 200, a propulsion system 202, a vehicle electronic controller 205, a vehicle power source 210, a vehicle coupling mechanism 215, a vehicle transceiver 220, a vehicle user interface 225, and a plurality of vehicle sensors 230. The unmanned aerial vehicle 105 described herein may include fewer, additional, or different components in different configurations than the unmanned aerial vehicle 105 illustrated in FIG. 2. For example, in some embodiments, the unmanned aerial vehicle 105 includes more than one electronic controller.

The propulsion system 202 provides sustained flight of the unmanned aerial vehicle 105. The propulsion system 202 illustrated in FIG. 2 includes motors 232, gears 233, and rotors 234. The motors 232 generate torque which is delivered to the rotors 234 via the gears 233. The rotors 234 rotate to provide sustained flight of the unmanned aerial vehicle 105.

The vehicle electronic controller 205 includes, among other things, a vehicle electronic processor 235 (for example, a microprocessor), vehicle memory 240, a vehicle input/output interface 245, and a bus. The bus connects various components of the vehicle electronic controller 205 including the vehicle memory 240 to the vehicle electronic processor 235. The vehicle memory 240 includes read only memory (ROM), random access memory (RAM), an electrically erasable programmable read-only memory (EEPROM), other non-transitory computer-readable media, or any combination thereof. The vehicle electronic processor 235 is configured to retrieve program instructions and data from the vehicle memory 240 and execute, among other things, instructions to perform the methods described herein. Additionally or alternatively, the vehicle memory 240 is included in the vehicle electronic processor 235. The vehicle input/output interface 245 includes routines for transferring information between components within the vehicle electronic controller 205 and other components internal and external to the unmanned aerial vehicle 105. In some embodiments, the vehicle electronic controller 205 also includes, among other things, a plurality of additional passive and active components such as resistors, capacitors, inductors, integrated circuits, and amplifiers. These components are arranged and connected to provide a plurality of electrical functions to the vehicle electronic controller 205 including, among other things, filtering, signal conditioning, or voltage regulation.

The vehicle power source 210 supplies a nominal AC or DC voltage to the unmanned aerial vehicle 105. In some embodiments, the vehicle power source 210 is powered by one or more batteries or battery packs included in the unmanned aerial vehicle 105 (for example, rechargeable batteries). Alternatively or in addition, the vehicle power source 210 is powered by mains power having nominal line voltages between, for example, 100 volts AC and 240 volts AC and frequencies of approximately 50 hertz to 60 hertz. In some embodiments, the unmanned aerial vehicle 105 is coupleable to mains power to recharge the vehicle power source 210. In some embodiments, the vehicle power source 210 is configured to supply lower voltages to operate circuits and components within the unmanned aerial vehicle 105. Alternatively or in addition, the vehicle electronic controller 205 includes a power supply module (not shown) that converts the voltage received from the vehicle power source 210 into lower voltages to operate circuits and components within the unmanned aerial vehicle 105.

The vehicle coupling mechanism 215 selectively couples the unmanned aerial vehicle 105 to the command device 110, as will be described below in more detail. In some embodiments, the vehicle coupling mechanism 215 selectively couples the vehicle power source 210 to the vehicle electronic controller 205, as will be described below in more detail.

The vehicle transceiver 220 is configured to provide communications between the unmanned aerial vehicle 105 and the command device 110 or other components within the unmanned aerial system 100 (for example, remote servers). The vehicle transceiver 220 transmits signals to one or more communication networks and receives signals from the communication networks. In some embodiments, signals include, for example, data, data packets, or any combination thereof. In some embodiments, the vehicle transceiver 220 includes separate transmitters and receivers. The communication networks may be implemented using various networks, for example, a cellular network, the Internet, a Bluetooth™ network, a wireless local area network (for example, Wi-Fi), a wireless accessory Personal Area Networks (PAN), cable, an Ethernet network, satellite, a machine-to-machine (M2M) autonomous network, and a public switched telephone network.

The vehicle user interface 225 is included to control the operation of the unmanned aerial vehicle 105. The vehicle user interface 225 can include any combination of digital and analog input devices required to achieve a desired level of control for the unmanned aerial vehicle 105. For example, the vehicle user interface 225 can include a touch-screen display, a plurality of knobs, dials, switches, buttons, and the like. The vehicle user interface 225 is operably coupled to the vehicle electronic controller 205 to control, for example, the operation of the propulsion system 202. In some embodiments, the vehicle user interface 225 includes a push button that activates the propulsion system 202. For example, responsive to the push button being selected by the user 115, the vehicle electronic controller 205 sends control signals to the propulsion system 202 which cause the motors 232 to turn ON and the rotors 234 to start rotating.

In some embodiments, the vehicle user interface 225 includes one or more indicators that indicate statuses of the unmanned aerial vehicle 105 (for example, visual indicators, auditory indicators, etc.). For example, the vehicle user interface 225 can include one or more light-emitting diodes (LEDs) that indicate when the unmanned aerial vehicle 105 is operating, when the unmanned aerial vehicle 105 is recording audio and video, and when the vehicle power source 210 is in need of a charge.

The plurality of vehicle sensors 230 includes sensors for determining the location, the position, the motion, and the orientation of the unmanned aerial vehicle 105. For example, the plurality of vehicle sensors 230 can include global positioning system (GPS) sensors, barometers, accelerometers, gyroscopes, magnetometers, distance sensors (for example, ultrasonic sensors, radar sensors, and LIDAR sensors), or a combination thereof.

In some embodiments, the vehicle electronic controller 205 determines an absolute or relative location of the unmanned aerial vehicle 105 based on data received from one or more of the plurality of vehicle sensors 230. Alternatively and in addition, the vehicle electronic controller 205 determines an absolute or relative location of the unmanned aerial vehicle 105 based at least in part on one or more location signals received via the vehicle transceiver 220. For example, the vehicle electronic controller 205 may determine the relative location of the unmanned aerial vehicle 105 to the command device 110 based on location signals transmitted by the command device 110.

In some embodiments, the plurality of vehicle sensors 230 includes sensors for recording the environment around the unmanned aerial vehicle 105 or the user 115. For example, the plurality of vehicle sensors 230 can include image sensors (for example, cameras) and audio sensors (for example, microphones), or both. In some embodiments, the image and/or audio data captured by the vehicle sensors 230 can be stored with the vehicle memory 240 for future access. Alternatively or in addition, the image and/or audio data captured by the vehicle sensors 230 can be transmitted to the command device 110. Attentively or in addition, the image and/or audio data captured by the vehicle sensors 230 can be transmitted to emergency responders to assist in emergency operations. For example, when the unmanned aerial vehicle 105 is deployed near a car crash, emergency responders can use the image and/or audio data captured by the vehicle sensors 230 to determine the extent of injuries suffered by occupants of the cars.

Figure 3:
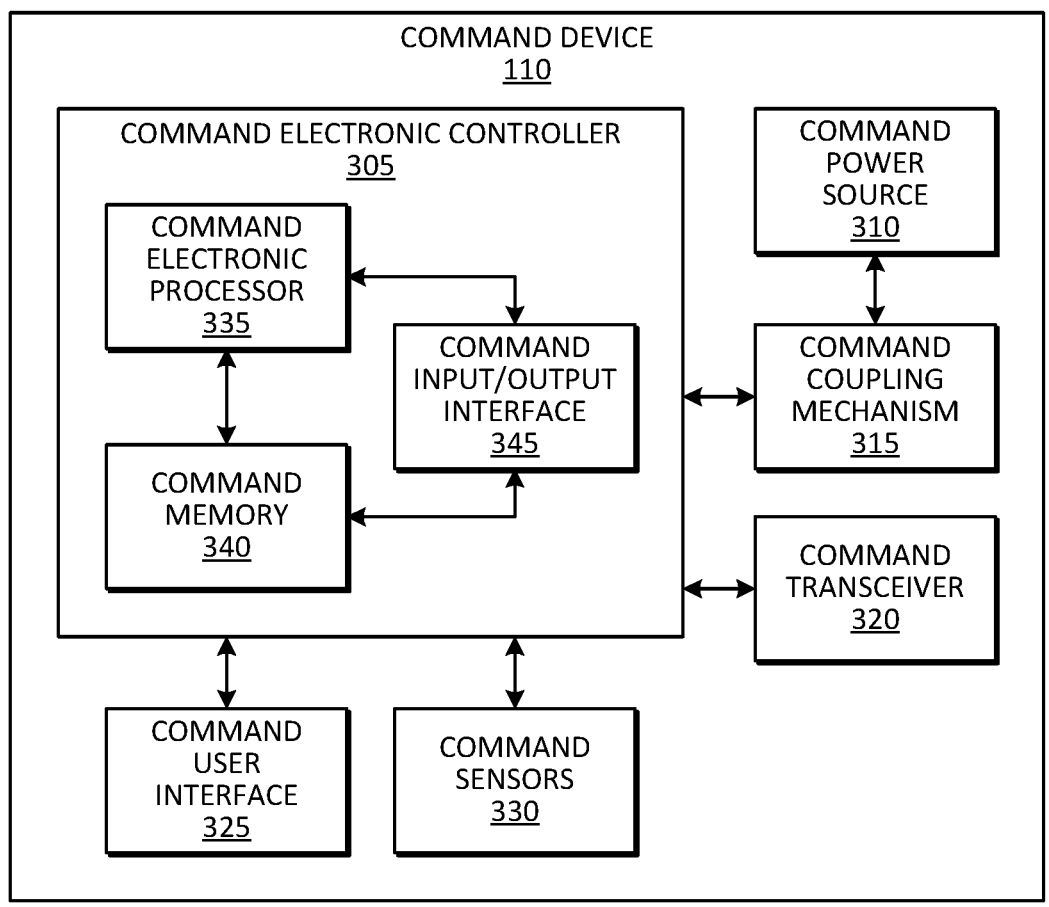
FIG. 3 is a diagram of a command device included in the unmanned aerial system of FIG. 1, in accordance with some embodiments.

FIG. 3 is a block diagram of one example embodiment of the command device 110. In the embodiment illustrated, the command device 110 includes a command electronic controller 305, a command power source 310, a command coupling mechanism 315, a command transceiver 320, a command user interface 325, and a plurality of command sensors 330. The command device 110 described herein may include fewer, additional, or different components in different configurations than the command device 110 illustrated in FIG. 3.

The command electronic controller 305 includes, among other things, a command electronic processor 335 (for example, a microprocessor), command memory 340, a command input/output interface 345, and a bus. The bus connects various components of the command electronic controller 305 including the command memory 340 to the command electronic processor 335. The vehicle memory 240 includes read only memory (ROM), random access memory (RAM), an electrically erasable programmable read-only memory (EEPROM), other non-transitory computer-readable media, or any combination thereof. The command electronic processor 335 is configured to retrieve program instructions and data from the command memory 340 and execute, among other things, instructions to perform the methods described herein. Additionally or alternatively, the command memory 340 is included in the command electronic processor 335. The command input/output interface 345 includes routines for transferring information between components within the command electronic controller 305 and other components internal and external to the command device 110. In some embodiments, the command electronic controller 305 also includes, among other things, a plurality of additional passive and active components such as resistors, capacitors, inductors, integrated circuits, and amplifiers. These components are arranged and connected to provide a plurality of electrical functions to the command electronic controller 305 including, among other things, filtering, signal conditioning, or voltage regulation.

The command power source 310 supplies a nominal AC or DC voltage to the command device 110. In some embodiments, the command power source 310 is powered by one or more batteries or battery packs included in the command device 110 (for example, rechargeable batteries). Alternatively or in addition, the command power source 310 is powered by mains power having nominal line voltages between, for example, 100 volts AC and 240 volts AC and frequencies of approximately 50 hertz to 60 hertz. In some embodiments, the command device 110 is coupleable to mains power to recharge the command power source 310. In some embodiments, the command power source 310 is configured to supply lower voltages to operate circuits and components within the command device 110. Alternatively or in addition, the command electronic controller 305 includes a power supply module (not shown) that converts the voltage received from the command power source 310 into lower voltages to operate circuits and components within the command device 110.

The command coupling mechanism 315 selectively couples the command device 110 to the unmanned aerial vehicle 105, as will be described below in more detail. In some embodiments, the command coupling mechanism 315 selectively couples the command power source 310 to the command electronic controller 305, as will be described below in more detail.

The command transceiver 320 is configured to provide communications between the command device 110 and the unmanned aerial vehicle 105 or other components within the unmanned aerial system 100 (for example, remote servers). The command transceiver 320 transmits signals to one or more communication networks and receives signals from the communication networks. In some embodiments, signals include, for example, data, data packets, or any combination thereof. In some embodiments, the command transceiver 320 includes separate transmitters and receivers.

The command user interface 325 is included to control the command device 110 or the operation of the unmanned aerial vehicle 105. The command user interface 325 is operably coupled to the command electronic controller 305 to control, for example, the operation of the propulsion system 202 on the unmanned aerial vehicle 105. The command user interface 325 can include any combination of digital and analog input devices required to achieve a desired level of control for the system. For example, the command user interface 325 can include a touch-screen display, a plurality of knobs, dials, switches, buttons, and the like.

The plurality of command sensors 330 includes sensors for determining the location of the command device 110. For example, the plurality of command sensors 330 can include global positioning system (GPS) sensors. In some embodiments, the plurality of command sensors 330 includes sensors for detecting motion of the command device 110 (for example, accelerometers, gyroscopes, and magnetometers).

In some embodiments, the command device 110 acts a remote control to enable the user 115 to control the operation of the unmanned aerial vehicle 105. For example, the command user interface 325 can includes joysticks and buttons or a touch-screen display which the user 115 manipulates to control the operation of the unmanned aerial vehicle 105.

Alternatively or in addition, the command device 110 acts as a tracking device to enable the unmanned aerial vehicle 105 to follow the command device 110. In some embodiments, the command device 110 continuously or periodically determines its location via one or more of the command sensors 330 and sends its determined location to the unmanned aerial vehicle 105 via the command transceiver 320. In such embodiments, the vehicle electronic controller 205 can use the received location of the command device 110 to operate the propulsion system 202 such that unmanned aerial vehicle 105 is positioned within a set (or predetermined) distance from the command device 110. In some embodiments, the command transceiver 320 sends location signals to the unmanned aerial vehicle 105. In such embodiments, the vehicle electronic controller 205 determines a relative position of the unmanned aerial vehicle 105 to the command device 110 based on measured signal strengths of the location signals received via the vehicle transceiver 220 and operates the propulsion system 202 such that the relative flight position of the unmanned aerial vehicle 105 is within a set (or predetermined) distance from the command device 110.

In some embodiments, the command device 110 acts as a tracking device to enable the unmanned aerial vehicle 105 to follow the user 115. For example, in some embodiments, the command device 110 is incorporated in a wearable device, such as a bracelet, pendent, or a pin. Alternatively or in addition, the command device 110 is (or is included in) a portable electronic device such as a smart phone or a tablet.

As described above, in some embodiments, the unmanned aerial vehicle 105 is coupleable to the command device 110. In particular, the vehicle coupling mechanism 215 of the unmanned aerial vehicle 105 is configured to connect with the command coupling mechanism 315 of the command device 110. Aside from providing mechanical coupling for storage purposes, in some embodiments, the vehicle coupling mechanism 215 and the command coupling mechanism 315 are configured to electrically disconnect the vehicle power source 210 from the vehicle electronic controller 205 and electrically disconnect the command power source 310 from the command electronic controller 305 when the vehicle coupling mechanism 215 is connected to the command coupling mechanism 315. In such embodiments, the vehicle coupling mechanism 215 and the command coupling mechanism 315 are also configured to electrically connect the vehicle power source 210 to the vehicle electronic controller 205 and electrically connect the command power source 310 to the command electronic controller 305 when the vehicle coupling mechanism 215 is separate from the command coupling mechanism 315. In other words, the unmanned aerial vehicle 105 and command device 110 are inactive when they are connected and are active when they are separated. Such a configuration preserves battery life by reducing power losses when the unmanned aerial vehicle 105 and the command device 110 are not in use. This configuration also provides a quick method for activating the unmanned aerial vehicle 105 and the command device 110.

Figure 4A:
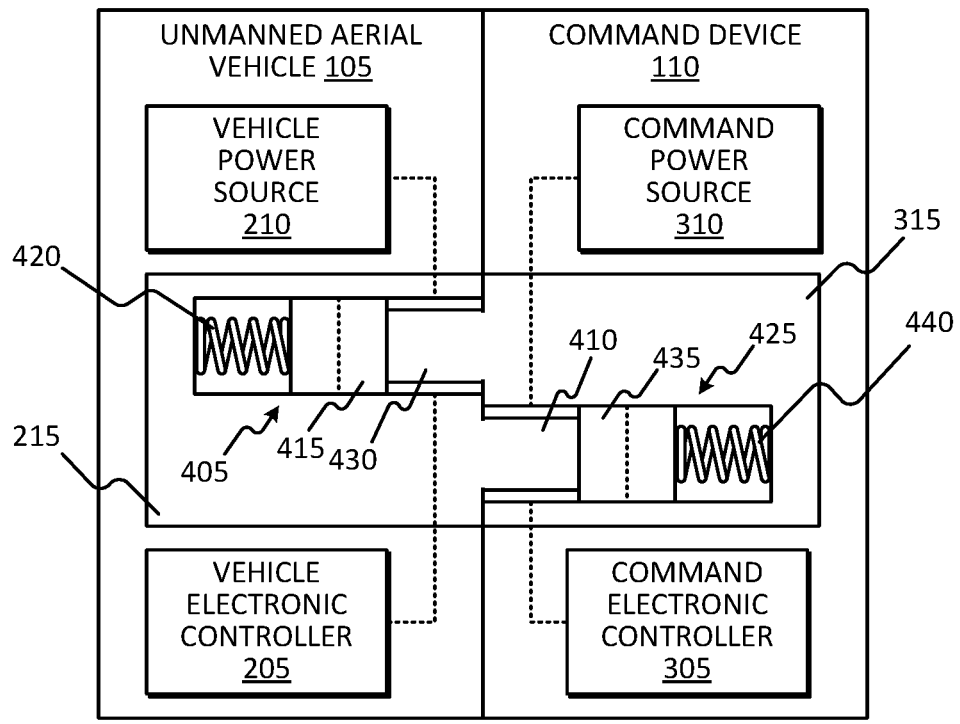
FIGS. 4A and 4B are diagrams of coupling mechanisms with electromechanical switches included in the unmanned aerial vehicle of FIG. 2 and the command device of FIG. 3, in accordance with some embodiments.
Figure 4B:
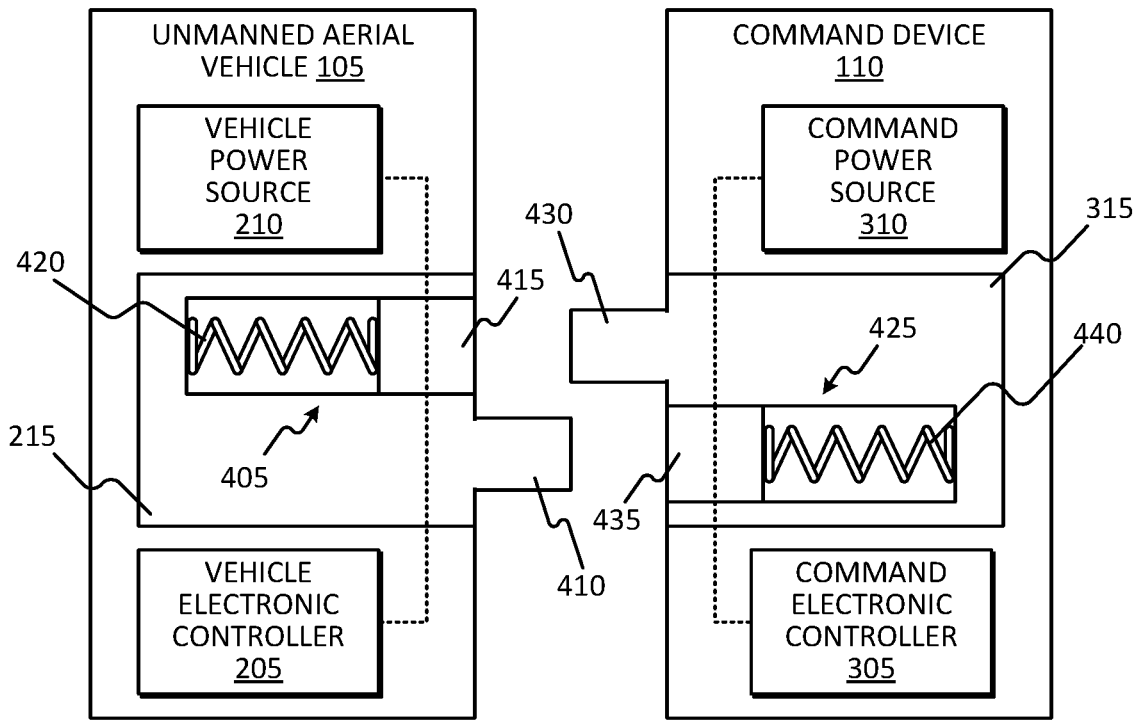

In some embodiments, the vehicle coupling mechanism 215 and the command coupling mechanism 315 include electromechanical switches such as normally-closed switches. For example, FIG. 4A is a diagram of one exemplary embodiment of the unmanned aerial vehicle 105 and the command device 110 when the vehicle coupling mechanism 215 and the command coupling mechanism 315 are connected. FIG. 4B illustrates the unmanned aerial vehicle 105 and the command device 110 when the vehicle coupling mechanism 215 and the command coupling mechanism 315 are separate. The vehicle coupling mechanism 215 illustrated in FIGS. 4A and 4B includes a first push-to-break biased switch 405 and a first protrusion 410. The first push-to-break biased switch 405 includes a first electrical contact 415 and a first spring 420. The command coupling mechanism 315 illustrated in FIGS. 4A and 4B includes a second push-to-break biased switch 425 and a second protrusion 430. The second push-to-break biased switch 425 includes a second electrical contact 435 and a second spring 440.

The first electrical contact 415 is movable between the position illustrated in FIG. 4A and the position illustrated in FIG. 4B. The vehicle power source 210 is electrically disconnected from the vehicle electronic controller 205 when the first electrical contact 415 is in the position illustrated in FIG. 4A. The vehicle power source 210 is electrically connected to the vehicle electronic controller 205 when the first electrical contact 415 is in the position illustrated in FIG. 4B. The first spring 420 applies a mechanical force that keeps the first electrical contact 415 in the positioned illustrated in FIG. 4B when the vehicle coupling mechanism 215 is separate from the command coupling mechanism 315. The second protrusion 430 moves the first electrical contact 415 from the position illustrated in FIG. 4B to the position illustrated in FIG. 4A when the vehicle coupling mechanism 215 is connected to the command coupling mechanism 315.

The second electrical contact 435 is movable between the position illustrated in FIG. 4A and the position illustrated in FIG. 4B. The command power source 310 is electrically disconnected from the command electronic controller 305 when the second electrical contact 435 is in the position illustrated in FIG. 4A. The command power source 310 is electrically connected to the command electronic controller 305 when the second electrical contact 435 is in the position illustrated in FIG. 4B. The second spring 440 applies a mechanical force that keeps the second electrical contact 435 in the positioned illustrated in FIG. 4B when the vehicle coupling mechanism 215 is separate from the command coupling mechanism 315. The first protrusion 410 moves the second electrical contact 435 from the position illustrated in FIG. 4B to the position illustrated in FIG. 4A when the vehicle coupling mechanism 215 is connected to the command coupling mechanism 315.

Figure 5A:
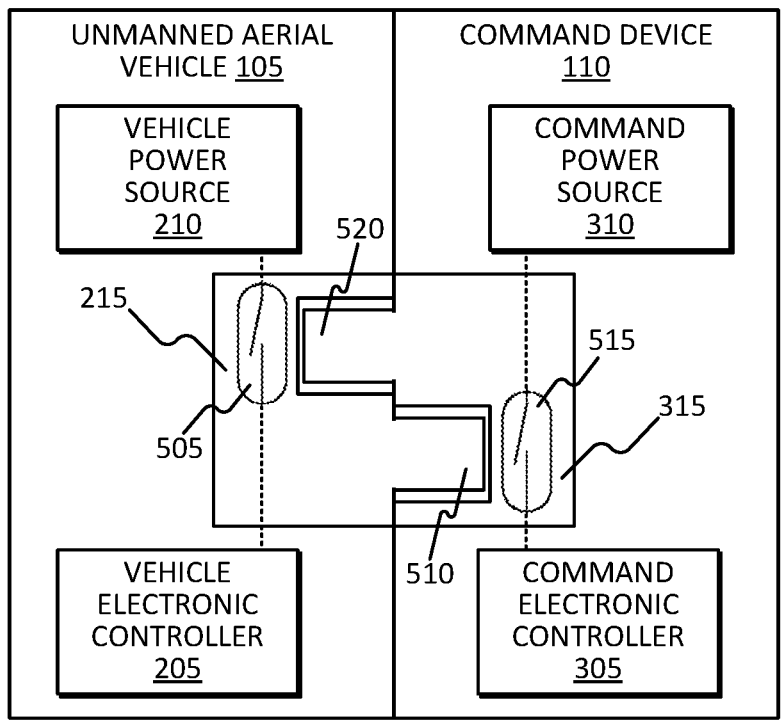
FIGS. 5A and 5B are diagrams of coupling mechanisms with magnetic switches included in the unmanned aerial vehicle of FIG. 2 and the command device of FIG. 3, in accordance with some embodiments.
Figure 5B:
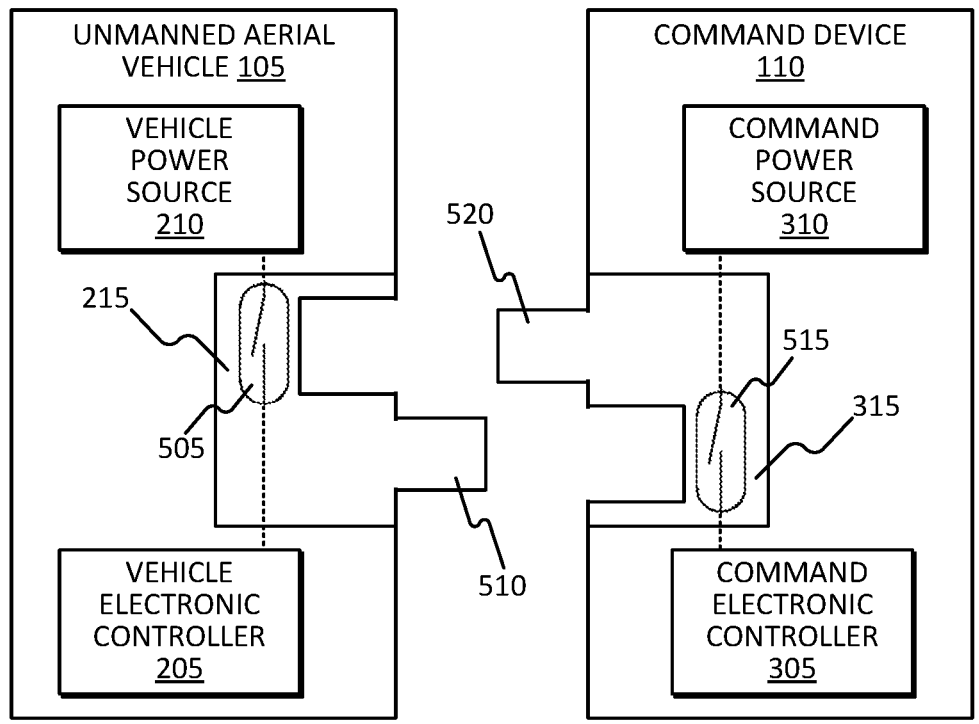

In some embodiments, the vehicle coupling mechanism 215 and the command coupling mechanism 315 include magnetic switches. FIG. 5A is a diagram of one exemplary embodiment of the unmanned aerial vehicle 105 and the command device 110 when the vehicle coupling mechanism 215 and the command coupling mechanism 315 are separate. FIG. 5B illustrates the unmanned aerial vehicle 105 and the command device 110 when the vehicle coupling mechanism 215 and the command coupling mechanism 315 are connected. The vehicle coupling mechanism 215 illustrated in FIGS. 5A and 5B includes a first normally-closed biased reed switch 505 and a first magnet 510 that protrudes from the unmanned aerial vehicle 105. The command coupling mechanism 315 illustrated in FIGS. 5A and 5B includes a second normally-closed biased reed switch 515 and a second magnet 520 that protrudes from the command device 110.

The first normally-closed biased reed switch 505 electrically disconnects the vehicle power source 210 from the vehicle electronic controller 205 when the vehicle coupling mechanism 215 is connected to the command coupling mechanism 315, as illustrated in FIG. 5A. In particular, when the vehicle coupling mechanism 215 is connected to the command coupling mechanism 315, the second magnet 520 is positioned close to the first normally-closed biased reed switch 505 such that the second magnet 520 exerts a magnetic force on the first normally-closed biased reed switch 505. This magnetic force causes the first normally-closed biased reed switch 505 to open and electrically disconnect the vehicle power source 210 from the vehicle electronic controller 205.

The first normally-closed biased reed switch 505 electrically connects the vehicle power source 210 to the vehicle electronic controller 205 when the vehicle coupling mechanism 215 is separate from the command coupling mechanism 315, as illustrated in FIG. 5B. In particular, when the vehicle coupling mechanism 215 is separate from the command coupling mechanism 315, no magnetic force is exerted on the first normally-closed biased reed switch 505. Consequently, the first normally-closed biased reed switch 505 is closed and the vehicle power source 210 is electrically connected to the vehicle electronic controller 205.

The second normally-closed biased reed switch 515 electrically disconnects the command power source 310 from the command electronic controller 305 when the vehicle coupling mechanism 215 is connected to the command coupling mechanism 315, as illustrated in FIG. 5A. In particular, when the vehicle coupling mechanism 215 is connected to the command coupling mechanism 315, the first magnet 510 is positioned close to the second normally-closed biased reed switch 515 such that the first magnet 510 exerts a magnetic force on the second normally-closed biased reed switch 515. This magnetic force causes the second normally-closed biased reed switch 515 to open and electrically disconnect the command power source 310 from the command electronic controller 305.

The second normally-closed biased reed switch 515 electrically connects the command power source 310 to the command electronic controller 305 when the vehicle coupling mechanism 215 is separate from the command coupling mechanism 315, as illustrated in FIG. 5B. In particular, when the vehicle coupling mechanism 215 is separate from the command coupling mechanism 315, no magnetic force is exerted on the second normally-closed biased reed switch 515. Consequently, the second normally-closed biased reed switch 515 is closed and the command power source 310 is electrically connected to the command electronic controller 305.

Figure 6A:
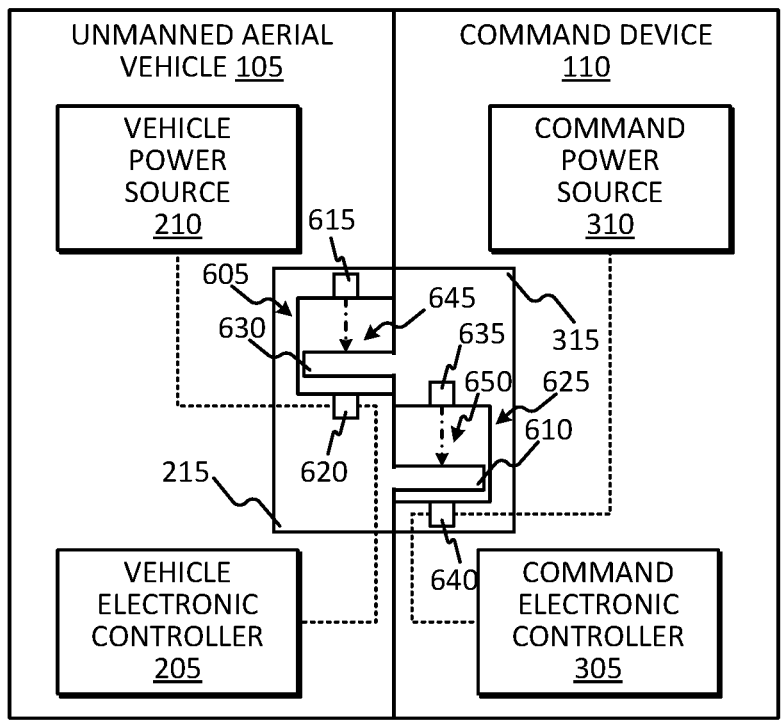
FIGS. 6A and 6B are diagrams of coupling mechanisms with optical switches included in the unmanned aerial vehicle of FIG. 2 and the command device of FIG. 3, in accordance with some embodiments.
Figure 6B:
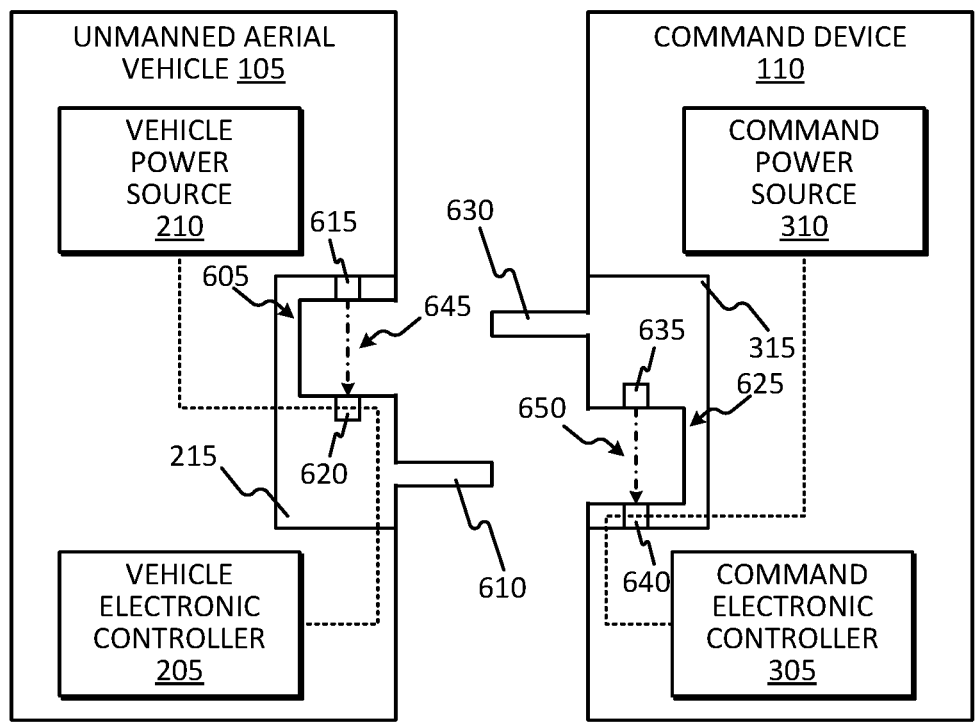

In some embodiments, the vehicle coupling mechanism 215 and the command coupling mechanism 315 include optical switches. FIG. 6A is a diagram of one exemplary embodiment of the unmanned aerial vehicle 105 and the command device 110 when the vehicle coupling mechanism 215 and the command coupling mechanism 315 are separate. FIG. 6B illustrates the unmanned aerial vehicle 105 and the command device 110 when the vehicle coupling mechanism 215 and the command coupling mechanism 315 are connected. The vehicle coupling mechanism 215 illustrated in FIGS. 6A and 6B includes a first normally-closed biased optocoupler 605 and a first protrusion 610. The first normally-closed biased optocoupler 605 includes a first LED 615 and a first phototransistor 620. The command coupling mechanism 315 illustrated in FIGS. 6A and 6B includes a second normally-closed biased optocoupler 625 and a second protrusion 630. The second normally-closed biased optocoupler 625 includes a second LED 635 and a second phototransistor 640. In alternate embodiments, the first normally-closed biased optocoupler 605 and the second normally-closed biased optocoupler 625 can include other types of light sources (for example, incandescent). In alternate embodiments, the first normally-closed biased optocoupler 605 and the second normally-closed biased optocoupler 625 can include other types of light sensors (for example, photoresistors, photodiodes, silicon controlled rectifiers, or triacs).

The first normally-closed biased optocoupler 605 electrically disconnects the vehicle power source 210 from the vehicle electronic controller 205 when the vehicle coupling mechanism 215 is connected to the command coupling mechanism 315, as illustrated in FIG. 6A. In particular, when the vehicle coupling mechanism 215 is connected to the command coupling mechanism 315, the second protrusion 630 is positioned within the vehicle coupling mechanism 215 such that the second protrusion 630 blocks a first optical path 645 of the first normally-closed biased optocoupler 605. In other words, the second protrusion 630 blocks the first phototransistor 620 from receiving light emitted by the first LED 615, as illustrated in FIG. 6A. When the first phototransistor 620 does not receive light emitted by the first LED 615, the first phototransistor 620 is turned OFF and the vehicle power source 210 is electrically disconnected from the vehicle electronic controller 205.

The first normally-closed biased optocoupler 605 electrically connects the vehicle power source 210 to the vehicle electronic controller 205 when the vehicle coupling mechanism 215 is separate from the command coupling mechanism 315, as illustrated in FIG. 6B. In particular, when the vehicle coupling mechanism 215 is separate from the command coupling mechanism 315, the first optical path 645 of the first normally-closed biased optocoupler 605 is unobstructed. In other words, the first phototransistor 620 receives light emitted by the first LED 615, as illustrated in FIG. 6B. When the first phototransistor 620 receives light emitted by the first LED 615, the first phototransistor 620 is turned ON and the vehicle power source 210 is electrically connected to the vehicle electronic controller 205.

The second normally-closed biased optocoupler 625 electrically disconnects the command power source 310 from the command electronic controller 305 when the vehicle coupling mechanism 215 is connected to the command coupling mechanism 315, as illustrated in FIG. 6A. In particular, when the vehicle coupling mechanism 215 is connected to the command coupling mechanism 315, the first protrusion 610 is positioned within the command coupling mechanism 315 such that the first protrusion 610 blocks a second optical path 650 of the second normally-closed biased optocoupler 625. In other words, the first protrusion 610 blocks the second phototransistor 640 from receiving light emitted by the second LED 635, as illustrated in FIG. 6A. When the second phototransistor 640 does not receive light emitted by the second LED 635, the second phototransistor 640 is turned OFF and the command power source 310 is electrically disconnected from the command electronic controller 305.

The second normally-closed biased optocoupler 625 electrically connects the command power source 310 to the command electronic controller 305 when the vehicle coupling mechanism 215 is separate from the command coupling mechanism 315, as illustrated in FIG. 6B. In particular, when the vehicle coupling mechanism 215 is separate from the command coupling mechanism 315, the second optical path 650 of the second normally-closed biased optocoupler 625 is unobstructed. In other words, the second phototransistor 640 receives light emitted by the second LED 635, as illustrated in FIG. 6B. When the second phototransistor 640 receives light emitted by the second LED 635, the second phototransistor 640 is turned ON and the command power source 310 is electrically connected to the command electronic controller 305.

In some embodiments, the propulsion system 202 of the unmanned aerial vehicle 105 is activated when the unmanned aerial vehicle 105 is separated from the command device 110. For example, responsive to receiving power from the vehicle power source 210 (as a result of the vehicle coupling mechanism 215 being separated from the command coupling mechanism 315), the vehicle electronic controller 205 sends control signals to the propulsion system 202 which cause the rotors 234 to rotate. In some embodiments, the vehicle electronic controller 205 initially operates in a standby-mode when the unmanned aerial vehicle 105 is separated from the command device 110. While in the stand-by mode, the propulsion system 202 is inactive and, in some embodiments, the vehicle electronic controller 205 waits for one or more actions or conditions to occur in order to active the propulsion system 202.

In some embodiments, the vehicle electronic controller 205 activates the propulsion system 202 responsive to receiving a signal from the vehicle user interface 225. For example, the vehicle user interface 225 can include a push button that, when selected, sends a signal to the vehicle electronic controller 205. Alternatively or in addition, the vehicle electronic controller 205 activates the propulsion system 202 responsive to receiving a signal from the command device 110. For example, the command user interface 325 can include a push button that, when selected, causes the command electronic controller 305 to send a signal to the vehicle electronic controller 205 via the command transceiver 320.

Alternatively or in addition, the vehicle electronic controller 205 activates the propulsion system 202 responsive to detecting specific movements (and orientations) of the unmanned aerial vehicle 105. In emergency situations, the user 115 may be unable to select a button included in the vehicle user interface 225 or the command user interface 325. Instead, the user 115 launches the unmanned aerial vehicle 105 by disconnecting the unmanned aerial vehicle 105 from the command device 110 and throwing the unmanned aerial vehicle 105. As discussed above, the plurality of vehicle sensors 230 included in the unmanned aerial vehicle 105 can includes sensors for detecting the motion and orientation of the airframe 200. Thus, responsive to detecting the user 115 throwing the unmanned aerial vehicle 105 based on data received from one or more of the vehicle sensors 230, the vehicle electronic controller 205 activates the propulsion system 202.

Figure 7A:
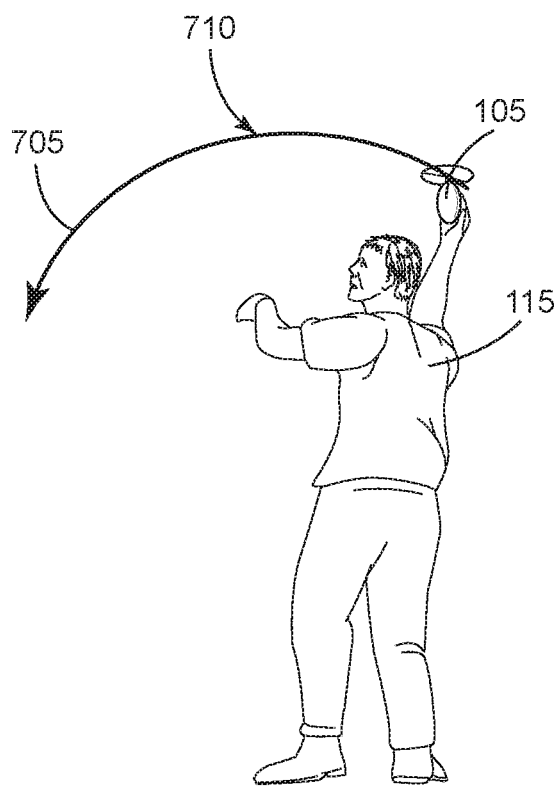
FIGS. 7A through 7D illustrate the unmanned aerial vehicle traveling along a parabolic trajectory.
Figure 7B:
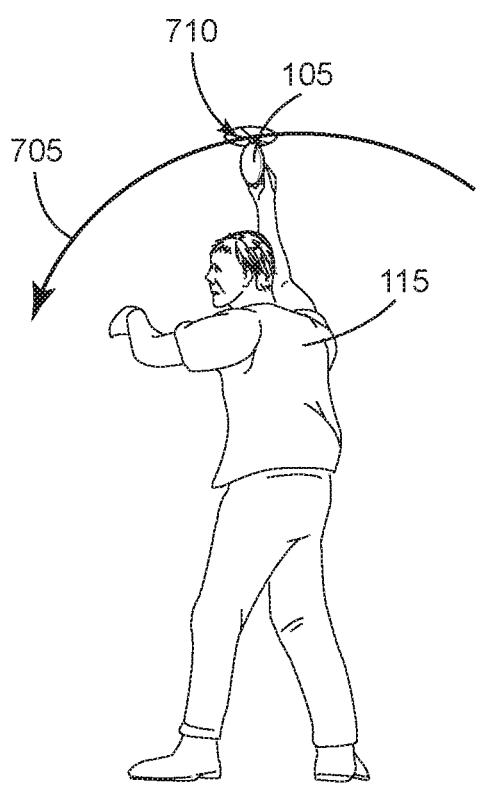
Figure 7C:
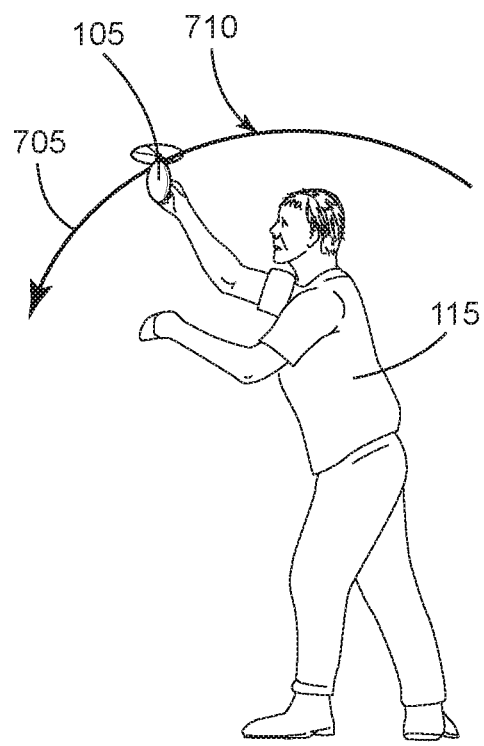
Figure 7D:
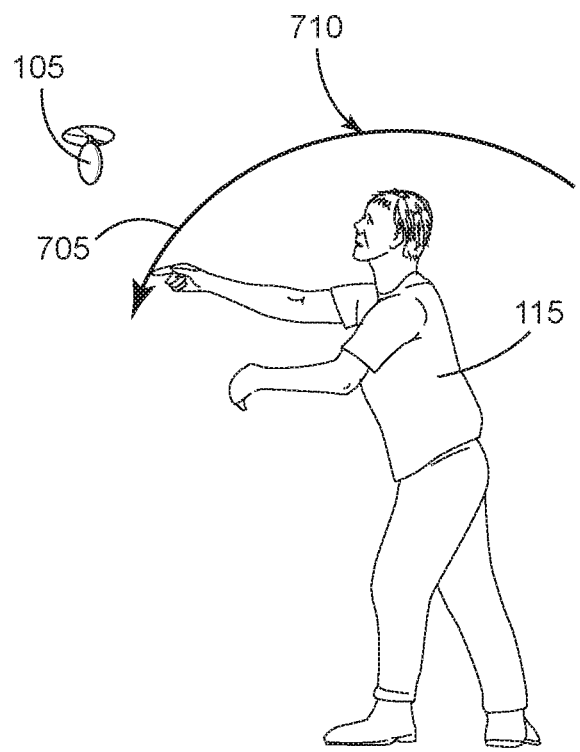

When thrown by the user 115, the unmanned aerial vehicle 105 can move along a parabolic trajectory. In some embodiments, the vehicle electronic controller 205 determines when the airframe 200 of the unmanned aerial vehicle 105 is moving along a parabolic trajectory and activates the propulsion system 202 when the airframe 200 is positioned at a vertex of the parabolic trajectory. FIGS. 7A through 7D illustrate an example of the user 115 throwing the unmanned aerial vehicle 105 along a parabolic trajectory 705. To improve the chances of a successful launch, the vehicle electronic controller 205 activates the propulsion system 202 when the unmanned aerial vehicle 105 is positioned at the vertex 710 of the parabolic trajectory 705, as illustrated in FIG. 7B. In FIG. 7C, the user 115 releases the unmanned aerial vehicle 105. In FIG. 7D, the propulsion system 202 operates to maintain continuous flight of the unmanned aerial vehicle 105.

Based on the configured of the airframe 200 and the propulsion system 202, the unmanned aerial vehicle 105 may require a specific (or predetermined) orientation in order to launch. For example, in embodiments where the rotors 234 of the propulsion system 202 are positioned at a top end of the airframe 200, the airframe 200 needs to be positioned upright in order to launch properly. Thus, in some embodiments, the vehicle electronic controller 205 checks the orientation of the airframe 200 prior to activating the propulsion system 202. The vehicle electronic controller 205 can determine the orientation of the airframe 200 based on data received from one or more of the vehicle sensors 230. For example, the vehicle electronic controller 205 determines the orientation of the airframe 200 based on data received from a gyroscope included in the plurality of vehicle sensors 230. In some embodiments, the vehicle electronic controller 205 activates the propulsion system 202 when the airframe 200 is positioned at the vertex 710 of the parabolic trajectory 705 and the airframe 200 is in a predetermined orientation (for example, an upright orientation).

Figure 8A:
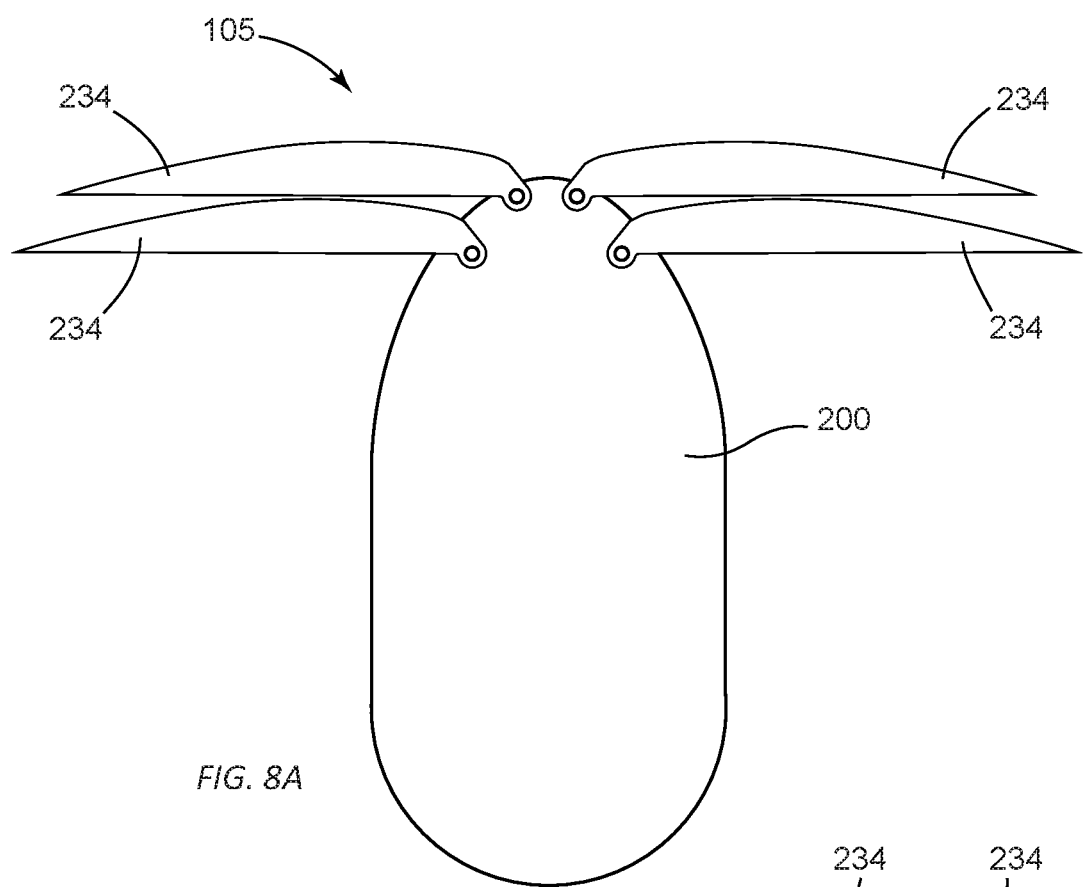
FIG. 8A is a diagram of the unmanned aerial vehicle in a deployed configuration, in accordance with some embodiments.
Figure 8B:
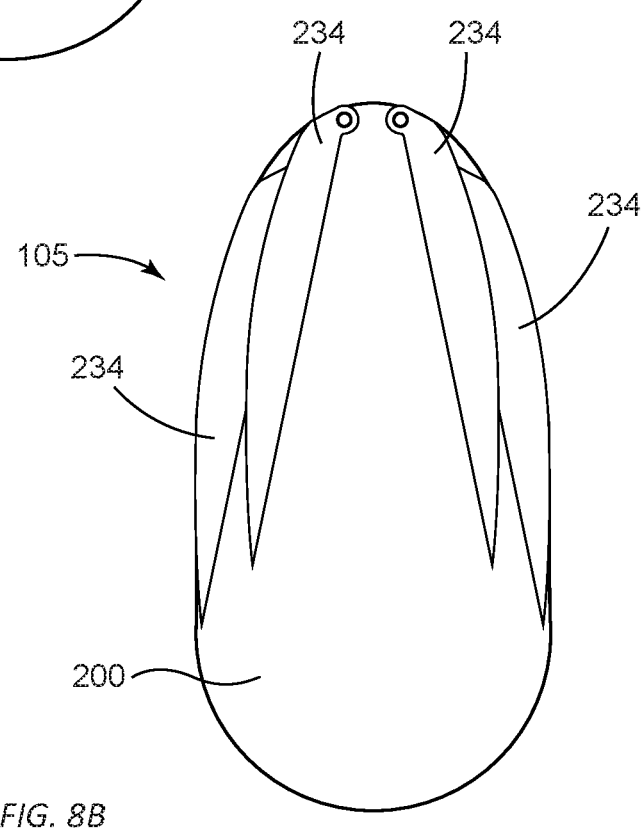
FIG. 8B is a diagram of the unmanned aerial vehicle in a collapsed configuration, in accordance with some embodiments.

In some embodiments, the rotors 234 of the propulsion system 202 can be collapsed against the airframe 200 for easier storage. FIGS. 8A and 8B are one example embodiment of the unmanned aerial vehicle 105 with rotors 234 that are collapsible. In FIG. 8A, the rotors 234 are positioned in a deployed configuration. In FIG. 8B, the rotors 234 are positioned in a collapsed configuration. When the rotors 234 are positioned in the collapsed configuration, the unmanned aerial vehicle 105 can easily be carried on the person of the user 115 until needed (for example, within a pocket). In the collapsed state, the unmanned aerial vehicle 105 can be approximately the size of a cigar, and can weigh a few ounces. An example of an unmanned aerial vehicle that can collapse down to pocket size is described in German Patent Publication No. DE 10 2005 014 949, which is incorporated by reference herein in its entirety. Another example of an unmanned aerial vehicle is described in U.S. Patent Application Publication No. 2017/0193308, which is incorporated by reference herein in its entirety. In some embodiments, the airframe 200 of the unmanned aerial vehicle 105 is configured in a helicopter configuration, a multi-rotor configuration, a fixed-wing configuration, and the like.

This disclosure is not limited in its application to the examples provided, the embodiments discussed, or to the details of construction and the arrangement of components set forth in the foregoing description or drawings. The disclosure is capable of other embodiments and of being practiced or of being carried out in various ways. Various embodiments and features are set forth in the following claims.

What is claimed is:

1. An unmanned aerial system comprising:
   an unmanned aerial vehicle including
      a propulsion system configured to provide sustained flight of the unmanned aerial vehicle,
      a vehicle power source,
      a vehicle electronic controller, and
      a vehicle coupling mechanism; and
   a command device including
      a command power source,
      a command electronic controller, and
      a command coupling mechanism configured to connect with the vehicle coupling mechanism, wherein when the vehicle coupling mechanism is connected to the command coupling mechanism,
the vehicle electronic controller is without power from the vehicle power source, and
the command electronic controller is without power from the command power source, and
wherein when the vehicle coupling mechanism is separate from the command coupling mechanism,
the vehicle electronic controller receives power from the vehicle power source, and
the command electronic controller receives power from the command power source.

2. The unmanned aerial system of claim 1,
wherein the vehicle coupling mechanism including a first switch that selectively electrically connects the vehicle power source to the vehicle electronic controller, and
wherein the command coupling mechanism including a second switch that selectively electrically connects the command power source to the command electronic controller.

3. The unmanned aerial system of claim 2,
wherein when the vehicle coupling mechanism is connected to the command coupling mechanism,
the vehicle power source is electrically disconnected from the vehicle electronic controller, and
the command power source is electrically disconnected from the command electronic controller, and
wherein when the vehicle coupling mechanism is separate from the command coupling mechanism,
the vehicle power source is electrically connected to the vehicle electronic controller, and
the command power source is electrically connected to the command electronic controller.

4. The unmanned aerial system of claim 3, wherein the first switch including a first normally-closed switch, and wherein the second switch including a second normally-closed switch.

5. The unmanned aerial system of claim 3, wherein the first switch including a first push-to-break biased switch, and wherein the second switch including a second push-to-break biased switch.

6. The unmanned aerial system of claim 5,
wherein the vehicle coupling mechanism further including a first protrusion,
wherein the command coupling mechanism further including a second protrusion, and
wherein when the vehicle coupling mechanism is connected to the command coupling mechanism,
the first protrusion presses the second push-to-break biased switch, and
the second protrusion presses the first push-to-break biased switch.

7. The unmanned aerial system of claim 3,
wherein the first switch including a first normally-closed biased reed switch and a first magnet,
wherein the second switch including a second normally-closed biased reed switch and a second magnet, and
wherein when the vehicle coupling mechanism is connected to the command coupling mechanism,
the first magnet is positioned in close proximity to the second normally-closed biased reed switch, and
the second magnet is positioned in close proximity to the first normally-closed biased reed switch.

8. The unmanned aerial system of claim 3, wherein the first switch including a first normally-closed biased optocoupler, and wherein the second switch including a second normally-closed biased optocoupler.

9. The unmanned aerial system of claim 8,
wherein the vehicle coupling mechanism further including a first protrusion,
wherein the command coupling mechanism further including a second protrusion, and
wherein when the vehicle coupling mechanism is connected to the command coupling mechanism,
the second protrusion is positioned to block a first optical path of the first normally-closed biased optocoupler, and
the first protrusion is positioned to block a second optical path of the second normally-closed biased optocoupler.

10. The unmanned aerial system of claim 1, wherein responsive to the vehicle coupling mechanism being separated from the command coupling mechanism, the vehicle electronic controller is configured to activate the propulsion system of the unmanned aerial vehicle.

11. The unmanned aerial system of claim 10, wherein responsive to the vehicle coupling mechanism being separated from the command coupling mechanism, the command electronic controller is configured to transmit a location signal via a command transceiver of the command device.

12. The unmanned aerial system of claim 11, wherein responsive to receiving the location signal via a vehicle transceiver of the unmanned aerial vehicle, the vehicle electronic controller is configured to
determine a location of the command device, and
operate the propulsion system based on the location of the command device such that the unmanned aerial vehicle is positioned within a predetermined distance from the location of the command device.

13. The unmanned aerial system of claim 12, wherein the command device is incorporated in a wearable device.

14. The unmanned aerial system of claim 1, wherein the propulsion system includes two or more rotors that are positionable in a collapsed configuration and in a deployed configuration, and wherein responsive to the vehicle coupling mechanism being separated from the command coupling mechanism, the two or more rotors are moved from the collapsed configuration to the deployed configured.

15. An unmanned aerial system comprising:
an unmanned aerial vehicle comprising
an airframe
a vehicle power source disposed within the airframe,
a propulsion system operatively mounted to the airframe and configured to provide sustained flight of the unmanned aerial vehicle,
one or more vehicle sensors configured to detect motion of the airframe,
a vehicle electronic controller disposed within the airframe and configured to
track the motion of the airframe based on data received from the one or more vehicle sensors,
determine when the airframe is moving along a parabolic trajectory based on the data received from the one or more vehicle sensors, and
responsive to determining when the airframe is positioned at a vertex of the parabolic trajectory, activate the propulsion system, and
a command device that is coupleable to the airframe of the unmanned aerial vehicle,
wherein the vehicle electronic controller is without power from the vehicle power source when the unmanned aerial vehicle is connected to the command device, and wherein the vehicle electronic controller receives power from the vehicle power source when the unmanned aerial vehicle is separate from the command device.

16. The unmanned aerial system of claim 15, wherein the propulsion system including
two or more rotors, and
one or more motors operatively coupled to the two or more rotors,
wherein the vehicle electronic controller activates the propulsion system by sending control signals to the propulsion system which cause the two or more rotors to rotate.

17. The unmanned aerial system of claim 15, wherein upon the vehicle electronic controller receiving power from the vehicle power source, the propulsion system is inactive until the vehicle electronic controller determines that the airframe is positioned at the vertex of the parabolic trajectory.

18. The unmanned aerial system of claim 17, wherein upon receiving power from the vehicle power source, the vehicle electronic controller tracks the motion of the airframe to determine when the airframe is moving along the parabolic trajectory.

19. The unmanned aerial system of claim 15, wherein the one or more vehicle sensors are further configured to detect an orientation of the airframe, and wherein the vehicle electronic controller is further configured to determine when the airframe is in a predetermined orientation based on the data received from the one or more vehicle sensors, and activate the propulsion system when the airframe is positioned at the vertex of the parabolic trajectory and the airframe is in the predetermined orientation.

* * * * *